March 16, 1965 L. G. SIMJIAN 3,173,742
DEPOSITORY MACHINE COMBINED WITH IMAGE RECORDING MEANS
Filed April 16, 1962 9 Sheets-Sheet 1

INVENTOR.
LUTHER G. SIMJIAN
BY
Erwin B. Steinberg
AGENT.

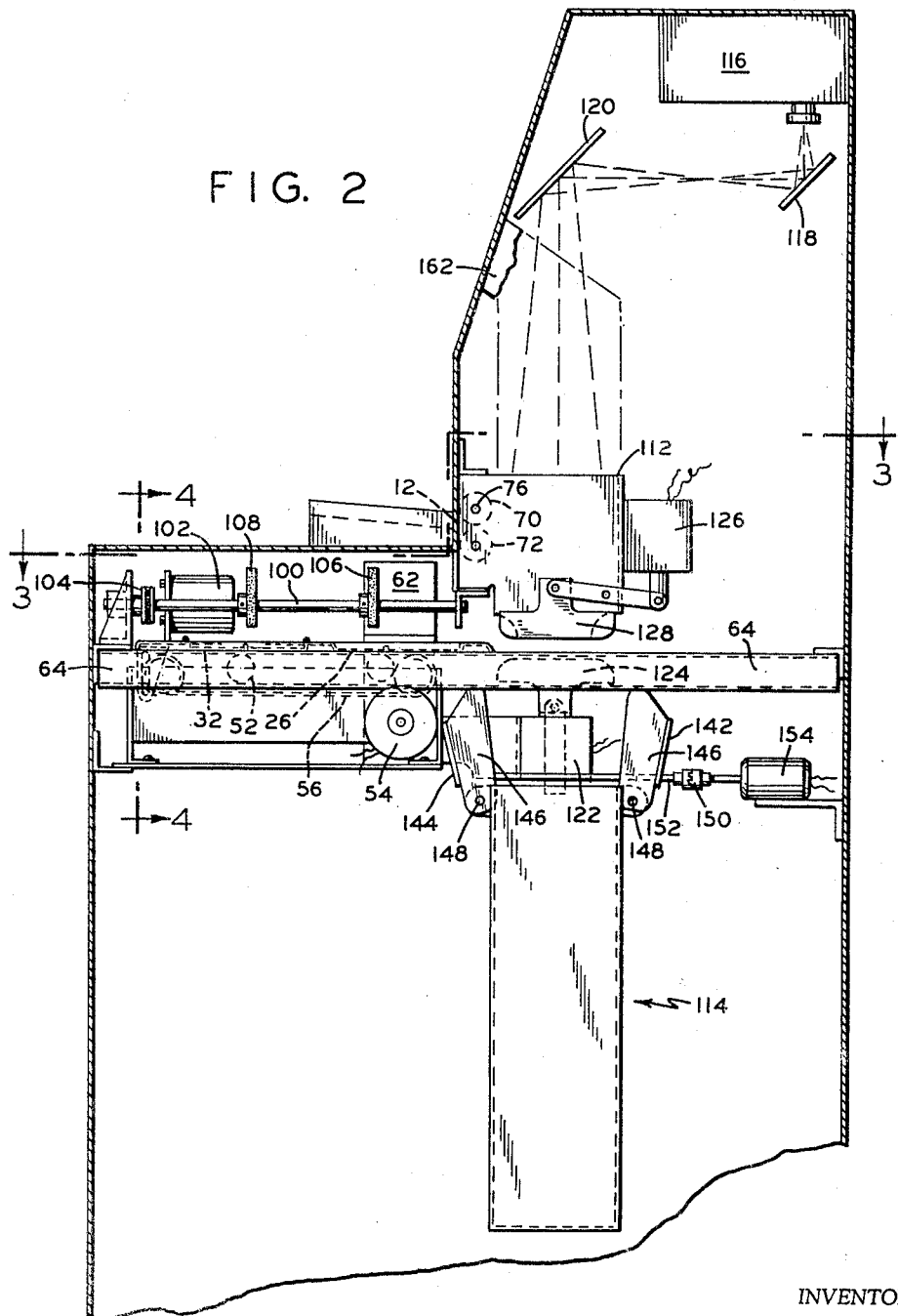

March 16, 1965    L. G. SIMJIAN    3,173,742
DEPOSITORY MACHINE COMBINED WITH IMAGE RECORDING MEANS
Filed April 16, 1962    9 Sheets-Sheet 3

INVENTOR.
LUTHER G. SIMJIAN
BY
Erwin B. Steinberg
AGENT.

March 16, 1965 L. G. SIMJIAN 3,173,742
DEPOSITORY MACHINE COMBINED WITH IMAGE RECORDING MEANS
Filed April 16, 1962 9 Sheets-Sheet 4

INVENTOR.
LUTHER G. SIMJIAN
BY
AGENT.

March 16, 1965     L. G. SIMJIAN     3,173,742
DEPOSITORY MACHINE COMBINED WITH IMAGE RECORDING MEANS
Filed April 16, 1962     9 Sheets-Sheet 5

INVENTOR.
LUTHER G. SIMJIAN
BY
Erwin B. Steinberg
AGENT.

March 16, 1965 L. G. SIMJIAN 3,173,742
DEPOSITORY MACHINE COMBINED WITH IMAGE RECORDING MEANS
Filed April 16, 1962 9 Sheets-Sheet 6

INVENTOR.
LUTHER G. SIMJIAN
BY
Erwin B. Steinberg
AGENT.

March 16, 1965 L. G. SIMJIAN 3,173,742
DEPOSITORY MACHINE COMBINED WITH IMAGE RECORDING MEANS
Filed April 16, 1962 9 Sheets-Sheet 7
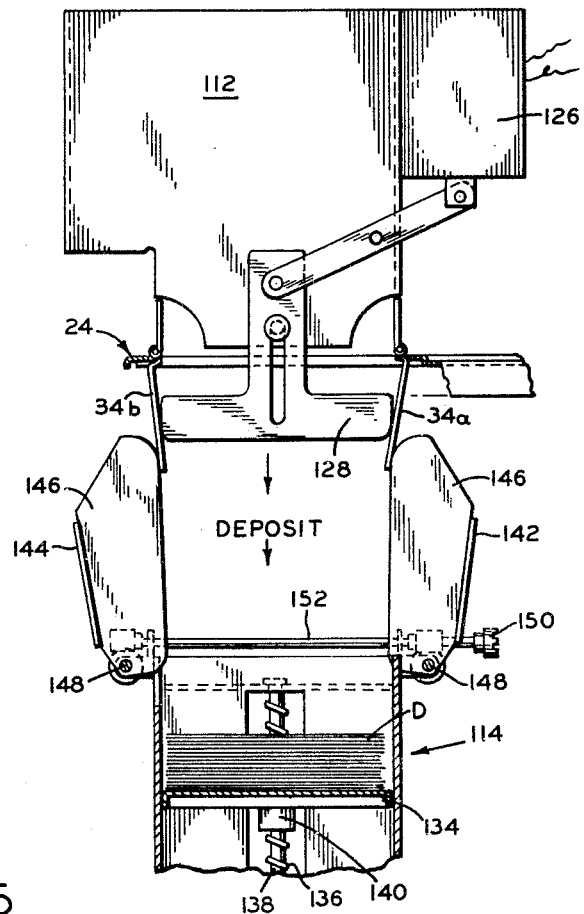
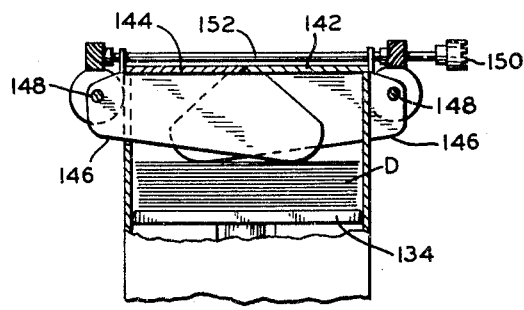
INVENTOR.
LUTHER G. SIMJIAN
BY
AGENT.

March 16, 1965 — L. G. SIMJIAN — 3,173,742
DEPOSITORY MACHINE COMBINED WITH IMAGE RECORDING MEANS
Filed April 16, 1962 — 9 Sheets-Sheet 8

INVENTOR.
LUTHER G. SIMJIAN
BY
AGENT.

March 16, 1965 L. G. SIMJIAN 3,173,742
DEPOSITORY MACHINE COMBINED WITH IMAGE RECORDING MEANS
Filed April 16, 1962 9 Sheets-Sheet 9

INVENTOR.
LUTHER G. SIMJIAN
BY
AGENT.

United States Patent Office 3,173,742
Patented Mar. 16, 1965

3,173,742
DEPOSITORY MACHINE COMBINED WITH
IMAGE RECORDING MEANS
Luther G. Simjian, Greenwich, Conn., assignor to Universal Match Corporation, Ferguson, Mo., a corporation of Delaware
Filed Apr. 16, 1962, Ser. No. 187,511
19 Claims. (Cl. 346—22)

This invention generally relates to automatic machines for depositing articles of value and, more particularly, has reference to a machine which is adapted to accept bank type deposits which are in the form of checks, currency and the like, each such deposit being accompanied by a deposit tag which identifies the depositor and usually itemizes the various items forming the deposit. The instant invention concerns several improvements and constructional simplifications of a depository machine concept revealed in my copending application for U.S. Letters Patent, Serial No. 44,778, filed July 22, 1960, now Patent No. 3,092,433, entitled "Depository Machine Combined With Image Recording Means."

Specifically, the design disclosed hereafter depicts a simplified depository machine which is adapted to accept any number of deposit items, to provide a documentary record of each of the deposited items, and to return to the depositor a validated deposit tag which originally accompanied the items forming the deposit. In order to provide this simplification, the instant apparatus is equipped with two aperture means, one aperture means for receiving one or more deposit tags and the other aperture means for receiving checks, paper currency and the like. The deposit tags initially supplied by the depositor are validated by validating means disposed within the apparatus. Image recording means located within the apparatus produce a documentary record of the validated tags. The remaining items of the deposit, that is, the checks and the currency, also are recorded by the image recording means whereby an image of each of the latter items is correlated with an image of a validated deposit tag. Finally, a validated and recorded deposit tag is returned to the depositor to serve as a receipt for the deposit.

The instant design, moreover, reveals several improvements in means for feeding deposit tags, simplification in the transfer of deposited items to a receptacle, and a novel receptacle arrangement for storing a large quantity of deposits.

One of the objects of this invention, therefore, is the provision of an improved depository machine which is equipped with image recording means and which is suitable for accepting bank type deposits.

Another object of this invention is the provision of an improved depository machine which receives any quantity of items for deposit and receives also an identifying deposit tag, provides documentary proof of each accepted article and finally returns to the depositor a duly validated and recorded deposit tag.

A further object of this invention is the provision of a depository machine which is equipped with a pair of apertures, one aperture for the deposit tags and another aperture for documents, particularly checks, currency and the like.

A still further object of this invention is the provision of a depository machine combined with image recording means which machine is characterized by simplified construction, ease of operation, and coaction of the various mechanisms to minimize maintenance.

Further and still objects of this invention will be apparent by reference to the following description when taken in conjunction with the accompanying drawings which:

FIGURE 2 is a view in elevational section of the machine;

FIGURE 14 is a partial vertical section of the tray at the deposit acceptance position and the deposit receptacle disposed underneath;

FIGURE 15 is a partial view of the receptacle after a deposit has been accepted;

Figure 1:
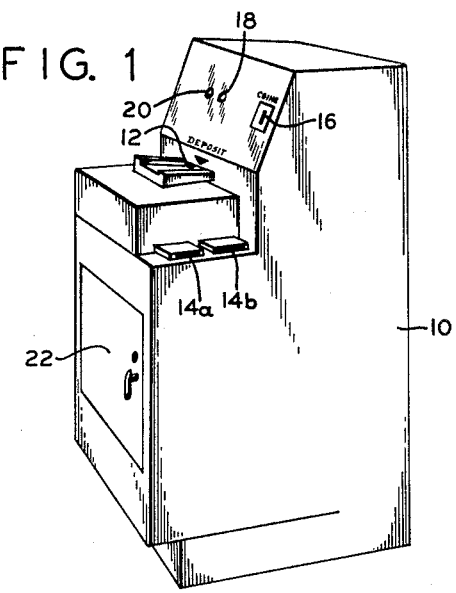
FIGURE 1 is a perspective side view of the depository machine, showing one side, front and top of the apparatus.

Referring now to the figures and FIGURE 1 in particular, numeral 10 identifies the enclosure which houses substantially all of the parts of the instant machine. A first aperture 12 serves for accepting and feeding in sequence the various items forming the deposit, primarily checks, stubs, coupons, paper currency and the like. A set of second aperture means 14a and 14b is provided for receiving a pair of deposit tags which in the conventional manner identify the depositor and itemize the items forming the deposit. In the preferred mode of operation, one deposit tag is inserted into each of the apertures 14, in which case one deposit tag is retained with the documents inserted at aperture 12 and the second deposit tag, after validation and recordation, is returned to serve as a receipt. The machine includes, furthermore, an aperture 16 for the deposit of coins, a push button switch 18 which is operated after the last item of deposit has been fed into the machine to signify the end of deposit, one or more signaling lights 20 to indicate the operation of the machine, and an access door 22 via which a deposit receptacle which holds the accepted deposits is removed from the enclosure. The side containing door 22 and aperture 12 may be considered the front of the machine.

*Tray construction*

Figure 8:
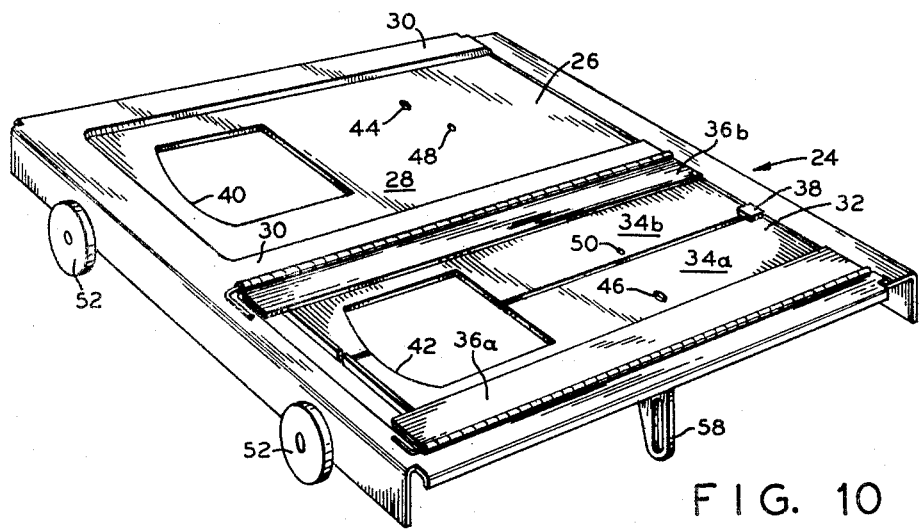
FIGURE 8 is a perspective view of the tray which receives the deposit tags.

One of the major elements of the machine comprises a flat, movable tray 24, depicted in perspective view in FIGURE 8. This tray is divided into two portions, each portion adapted to receive a deposit tag inserted at apertures 14a and 14b respectively. The rear portion of the tray, which is nearest the rear of the machine and identified generally by numeral 26, has a bottom panel 28 and an overlaying three-sided frame 30. A deposit tag received on this portion via aperture 14b is held on this tray portion between bottom panel 28 and pheripheral frame 30. The tag therefore, will move with the tray inside the machine.

Numeral 32 identifies the front portion of the tray which is nearest the front of the machine and is adapted to receive a deposit tag via aperture 14a. This portion has a pair of hingedly mounted, removable bottom panels 34a and 34b. Associated with this front portion of the tray there is a set of hinged frame members 36a and 36b. A deposit tag inserted on this front portion of the tray comes to rest between bottom panels 34a and 34b, and the frame members 36a and 36b. In both instances, frame 30 and members 36a and 36b serve to retain the deposit tags in a substantially flat condition.

A document resting on the front portion of the tray can be transferred to a deposit storage receptacle disposed underneath by pivoting bottom panels 34a and 34b in a downward direction so that all items supported on the panels drop into the receptacle. Upward motion of the hinged bottom panels is limited by a stop 38.

Each of the tray portions is provided with a respective cutout 40 and 42 for enabling a validating means to engage the deposit tags resting on the respective tray portions and affix validating data to the respective tags. Additionally, each portion is provided with a small circular opening, numerals 44 and 46 respectively, through which stop pins extend to limit the travel of each tag when a depositor inserts the tags into the respective apertures 14a and 14b. A second set of apertures 48 and 50 respectively, is disposed for enabling photoelectric sensing means to determine whether deposit tags have been supplied to the machine with their leading edge resting in proximity to the pins mentioned heretofore.

*Motion of tray*

Tray 24 is movable inside the machine by means of wheels 52 which ride on spaced rails 64. The reciprocatory motion of the tray occurs along a single horizontal plane, from an initial position close to the front of the machine panel to a position towards the rear. A motor 54 (FIGURES 4 and 5) drives via suitable linkage an endless chain 56 to move the tray from the initial position at which the respective tray portions are in communication with apertures 14a and 14b (FIGURE 1) to a fully rearward position, which may be called the "deposit acceptance position." At this latter position, front tray portion 32 is disposed so that items of deposit fed through aperture 12 at the front of the machine come to rest and are stacked one on top of the other on hinged panels 34a and 34b.

Figure 9:
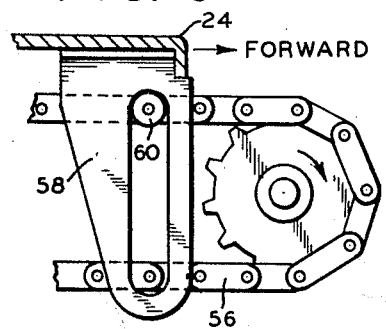
FIGURE 9 is a view along lines 9—9 in FIGURE 4, depicting the mechanism for moving the tray inside the machine.
Figure 10:
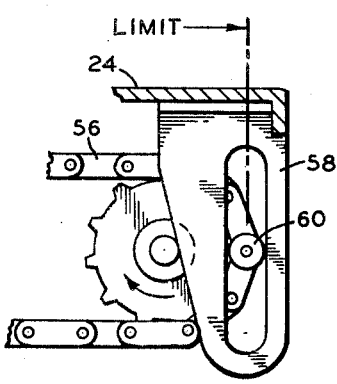
FIGURE 10 is a view similar to FIGURE 9, depicting the drive means for the tray when the tray is at one extreme end of its excursion.
Figure 11:
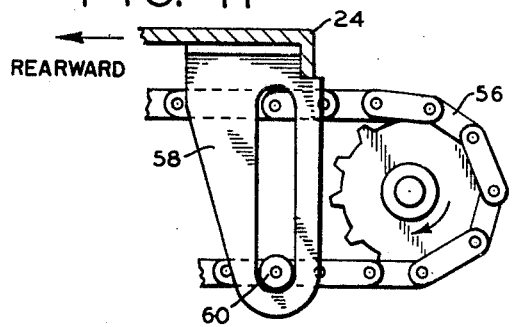
FIGURE 11 is a view similar to FIGURES 9 and 10, depicting the return travel of the tray.

Motion of the tray is accomplished as best seen in FIGURES 9, 10 and 11. A slotted bracket 58 extends from the underside of the tray proper. A pin 60, protruding from the side of endless chain 56, rides in the slot of the bracket and drives the tray. As the tray is moved in a forward direction, pin 60 rides at the upper end of the slot in bracket 58, and as the tray approaches its extreme position along its horizontal excursion, the pin changes its position from the upper end of the bracket to the lower end as clearly seen in FIGURE 10 and during the return travel, as seen in FIGURE 11, the pin rides at the lower end of the slot, thus causing reciprocatory motion of the tray as chain 56 rotates about stationary sprockets. In this way, the tray is carried through its reciprocatory travel without the necessity of providing a reversible motor.

*Tray positions*

Figure 13:
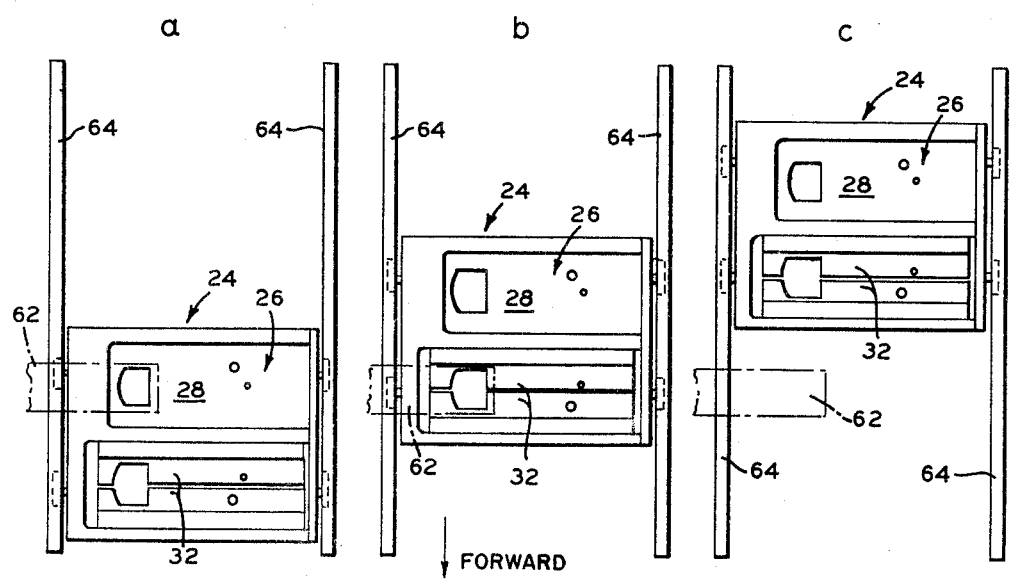
FIGURE 13 is an explanatory sketch showing the various positions which the tray per FIGURE 8 occupies along its rearward travel.

The tray motion and the various positions which the tray occupies along its excursion is explained more clearly in FIGURE 13. Initially, the tray is disposed as shown schematically in FIGURE 13a. In this position, rear tray portion 26 is in communication with aperture 14b and front tray portion 32 is in communication with aperture 14a. By means to be described later, deposit tags received via these apertures and resting partially on the respective portions are driven fully onto the associated portions. The deposit tag inserted through aperture 14b comes to rest on bottom panel 28 and is thereafter in position for validation by a stationary validating means 62 disposed inside the machine. This validating means is a commercial product and is provided with embossed wheels or plates and an opposing platen for engaging the deposit tag through the cutout of the bottom panel. The validating means, when actuated, affixes validating indicia to the deposit tag, such as date, deposit number, bank name and location, etc. During the next cycle of operation, the tray 24 moves toward the rear of the machine (away from the front panel) by the width of tray portion 26 so that in this intermediate position, the other deposit tag inserted through aperture 14a and resting on front portion 32 is in position for being validated by the stationary validating means 62. At the final position of the tray, which may be called the deposit acceptance position, the tray has moved to its rearmost position away from the front of the machine and both tags have cleared the validating means. In this deposit acceptance position of the tray, documents fed through aperture 12 come to rest in stacked fashion on tray portion 32. Image recording means are placed to view all documents coming to rest on tray portion 32 when in its rearmost position.

*Feeding of checks, currency and the like*

Figure 7:
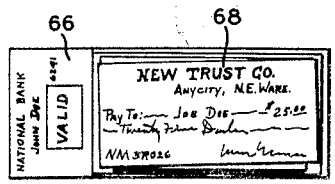
FIGURE 7 is a top plan view illustrating the relative positions of the deposit tag and succeeding deposit items as seen by the image recording means.

FIGURE 7 depicts the relative positions in which checks and currency documents fed through aperture 12 come to rest on the deposit tag which in turn rests on the front portion of tray 32. Tray 24 is located relative aperture 12 in such a way that a portion of the deposit tag 66( FIGURE 7) protrudes from under the checks and currency documents 68 which are fed through aperture 12 and come to rest superposed on the tag. In this way, the depositor identifying notations of the tag as well as the validating data affixed thereto by the validation means 62 remain unobscured to the image recording means, and as each item of deposit is recorded by the image recording means, the image of each check or currency document is associated with the identifying data from the deposit tag.

Figure 4:
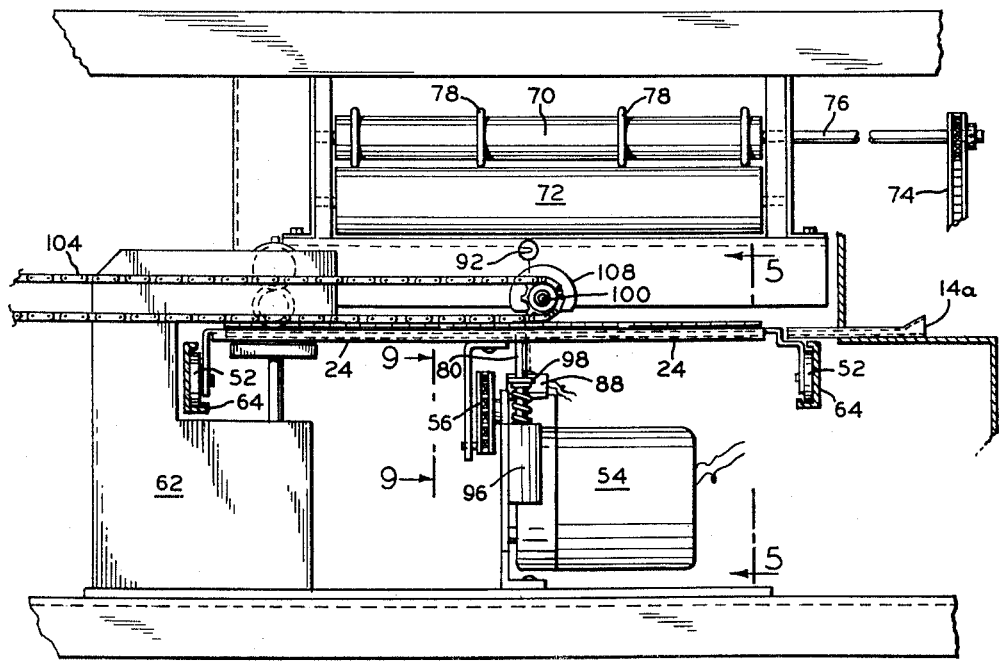
FIGURE 4 is a view along section lines 4—4 in FIGURE 2.

The physical relation of the validating means 62 and tray 24 relative to the feed means associated with aperture 12 is shown more clearly in FIGURE 4. The means for feeding documents, such as checks and currency, into the enclosure comprise a set of parallel rollers 70 and 72, this set being driven by a motor (not shown), chain and sprocket combination 74, and shaft 76 forming a part of roller 70. Roller 70 is provided with a plurality of spaced annular resilient rings 78 to grip each document as the latter is fed between the rollers. The precise roller construction, controls therefor, and means for preventing the surreptitious removal of documents is substantially as shown in my copending application for U.S. Letters Patent, Serial No. 093,720, filed March 6, 1961, entitled: "Feeding Mechanism for Documents and the Like," now patent No. 3,095,192, granted on June 25, 1963. The rollers are disabled for feeding documents until the tray is in the deposit acceptance position.

*Feeding deposit tags onto tray and removal of tags from tray*

Figure 3:
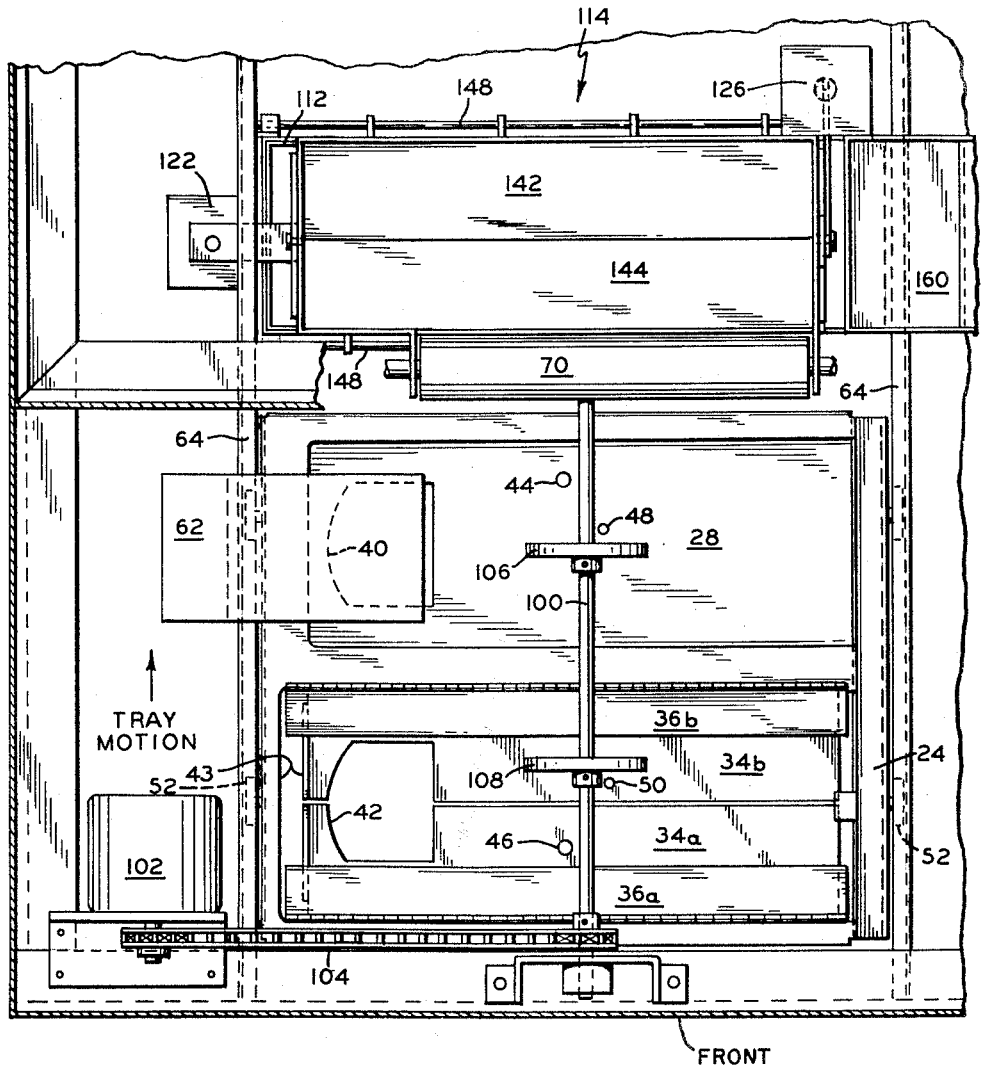
FIGURE 3 is a top plan view along section lines 3—3 in FIGURE 2.
Figure 5:
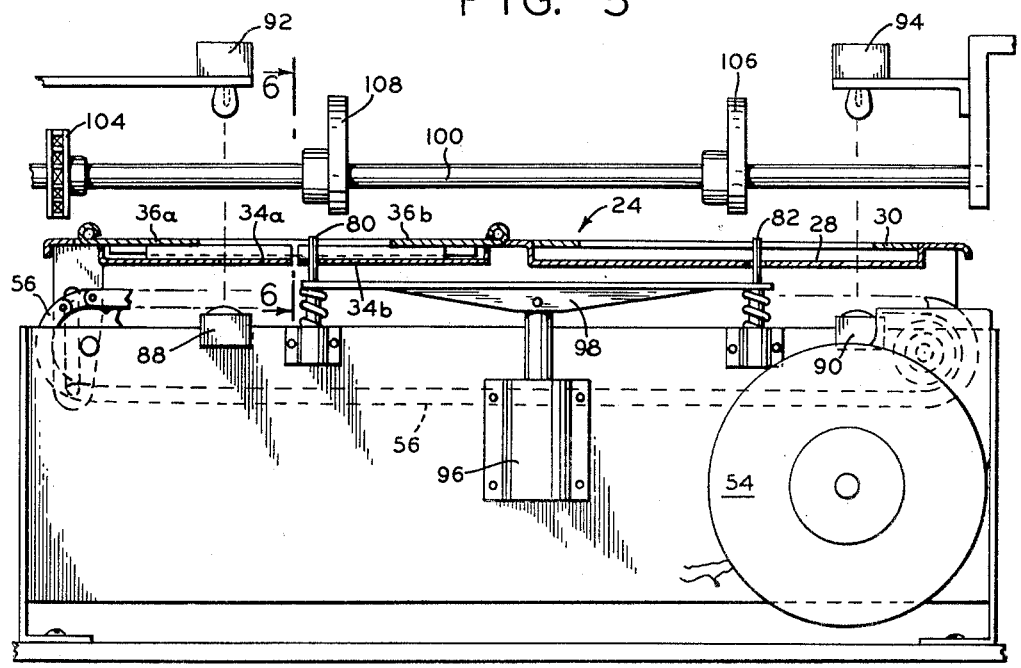
FIGURE 5 is a view along section lines 5—5 in FIGURE 4.
Figure 6:
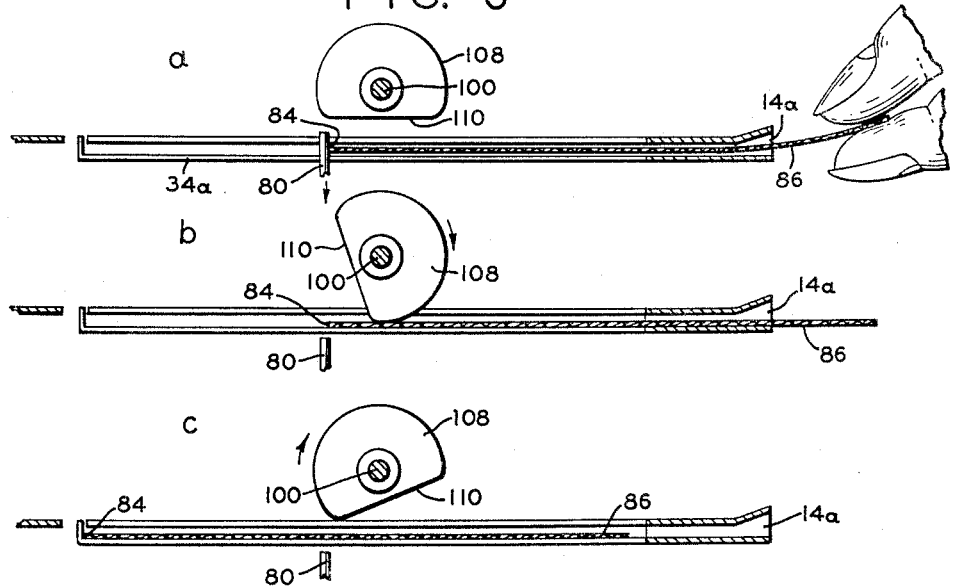
FIGURE 6 is an explanatory view for explaining the method and means for feeding the deposit tag into the machine.

The feeding of deposit tags onto the movable tray will be more clearly understood by reference to FIGURES 2, 3, 5 and 6. A depositor desirous of using the machine inserts filled-out deposit tags into respective apertures 14a and 14b (FIGURE 1). The leading edges of the deposit tags encounter raised pins 80 and 82, one pin protruding through aperture 44 of bottom panel 28 of the rear tray portion, and the other pin extending through aperture 46 of hinged bottom panel 34a, the latter panel forming a part of front portion 32 of the tray. This condition is clearly visible in FIGURE 6a where the leading edge 84 of a deposit tag 86 rests against pin 80 which protrudes through aperture 46 in bottom panel 34a. A similar condition prevails with respect to the adjacent tray portion 26. The presence of a deposit tag on the tray portions is sensed by a set of photoelectric sensing means 88 and 90 which coact with light sources 92 and 94 via respective apertures 48 and 50 (FIGURES 3, 5 and 8). Since the photoelectric sensing means are connected in series, the presence of deposit tags on the tray portions is sensed by an absence of a signal on the respective photoelectric means, and this absence in turn energizes solenoid 96 whose plunger is coupled to a cross bar 98 (FIGURE 5) to lower pins 80 and 82. Above the deposit tags, there is positioned a shaft 100 (FIGURE 3) which is driven from a reversible motor 102 via suitable sprockets and an endless chain 104. This shaft has attached thereto a pair of spaced driving rollers 106 and 108, one roller being disposed to engage each of the deposit tags. Additionally, the driving motor is provided with a one-revolution clutch (not shown) to cause rollers 106 and 108 to rotate through a single revolution every time that the motor is energized.

Each of the rollers is provided with a flattened circumferential area 110 in order to provide clearance when the deposit tags are inserted at apertures 14a and 14b respectively. As soon as the stop pins have been retracted as shown in FIGURE 6b, rollers 106 and 108 are rotated and in due course, the periphery of each roller engages the associated deposit tag and drives the leading edge of each tag fully onto the respective tray portion so that the leading edge of each deposit tag comes to rest against the rear edge of the respective tray portions in which position the tags completely cover respective cut-outs 40 and 42. This latter condition is shown quite clearly in FIGURE 6c. As depicted, the deposit tags now are no longer available to the depositor.

With the tags in proper position, the tray is ready to transport the deposit tags through the validating means 62 and assumes sequentially the positions shown schematically in FIGURE 13. When a deposit has been effected, the tray returns to the initial position, bringing along with it the deposit tag inserted originally at aperture 14b and resting between fixed bottom panel 28 and overlaying frame 30. At this point, motor 102 is driven in the reverse direction, both rollers 106 and 108 going through one cycle of operation, thus causing roller 106 to drive the deposit tag partially out of aperture 14b. Hence, this validated deposit tag is accessible to the depositor and by virtue of having been validated and recorded serves as a receipt.

*Deposit recording and storage*

Figure 12:
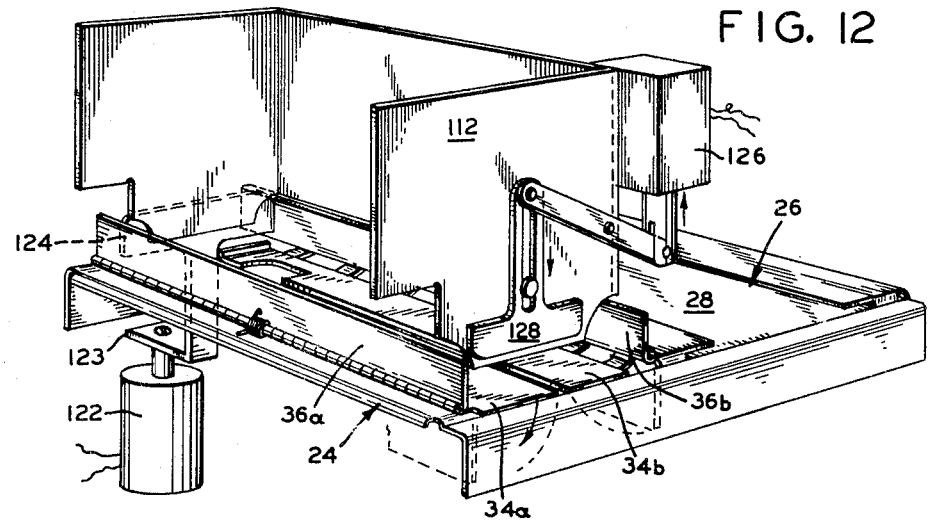
FIGURE 12 is a perspective view of the tray and associated elements when the tray is positioned at the deposit acceptance position.

When the tray 24 is at its rearmost position, that is, when tray 24 has moved as far as possible to the right viewing FIGURE 2, the tray portion with hinged frame members 36a and 36b and removable bottom panels 34a and 34b is positioned underneath a three-sided vertical shroud 112 as best seen in FIGURES 2 and 12. The front wall of the enclosure forms the fourth side of the shroud. At this position of the tray, a deposit receptacle identified generally by numeral 114 is disposed underneath the hinged panels so that upon pivoting of the movable panels 34a and 34b, all items of deposit previously assembled on this tray portion drop into the receptacle. This particular position of the tray has been identified previously as "deposit acceptance position."

As movable tray 24 first approaches the position underneath shroud 112, the first deposit tag inserted into the machine via aperture 14b comes in view of image recording means 116 which is disposed to obtain an image of this previously validated tag by means of inclined image reflecting means 118 and 120. Control means to be described later, cause operation of the image recording means, thus providing documentary evidence of the first deposit tag which near the end of the cycle is returned to the depositor as has been described above. During further forward travel of the tray, the tray portion containing this first deposit tag moves toward the rear of the shroud 112 as clearly seen in FIGURE 12. At this instant, the tray stops, having reached the deposit acceptance position and also the end of its excursion along the horizontal plane. The second deposit tag supplied to the tray by means of aperture 14a and disposed above pivoted panels 34a and 34b is now in view of the image recording means. Moreover, this tray portion is placed in communication with aperture 12 and any document fed between rollers 70 and 72 comes to rest and stacked on this portion.

As a first step, solenoid 122 disposed outside the shroud is energized to raise, via linkage 123, plunger 124 which in turn, raises movable frame members 36a and 36b to provide an open tray surface. The plunger rises through aperture 43 (FIGURE 3) to engage the ends of the frame members. Movable frame members 36a and 36b when in their lowered position assure that a deposit tag which may be curled, bent, or uneven is retained by the tray, will be fed through the validating means and brought to the deposit acceptance position without mechanical interference. Next, feed rollers 70 and 72 associated with aperture 12 are released so that documents, such as checks and currency, can be fed between the rollers, each document coming to rest on top of the tray portion having the hinged bottom panels. Associated with the rollers, there is a sensing switch which trips the image recording means every time that the rollers are started to feed a document. When the first document is fed between the rollers, image recording means 116 are caused to provide a record and since the first document has not yet come to rest on the tray, the recording means provide a record of the deposit tag carried by this particular tray portion to the deposit acceptance position. Next, the first document fed through feed rollers 70 and 72 comes to rest on the deposit tag as shown in FIGURE 7 and when a further item is fed through rollers, the image recording means is actuated to provide an image of the first item of deposit together with a portion of the deposit tag, substantially as shown in FIGURE 7. All further items fed through the respective rollers come to rest in stacked fashion on this tray portion 32. In this way, each item of deposit is recorded together with a portion of the underlying deposit tag, so that there is a complete record of each check, currency document or other item together with depositor identifying data.

When the last item of deposit has been fed through aperture 12, the depositor operates push button 18 at the front panel (FIGURE 1) to signify the end of the deposit action. Operation of this push button operates the image recording means to provide a record of the last item of deposit together with the underlying deposit tag. Subsequently, solenoid 126 is energized momentarily, which via a suitable linkage, lowers plunger 128 disposed outside the confines of the shroud. The plunger pivots the movable bottom panels 34a and 34b in a downward direction, thus causing the entire stack of deposited items to drop into the deposit receptacle 114 disposed underneath. Briefly thereafter, plunger 128 returns to its original position, solenoid 122 is de-energized and the tray returns to its starting position at which the first-validated deposit tag resting on tray portion 26 is ejected partially out of aperture 14b as has been described previously.

Deposit receptacle

The deposit receptacle (FIGURES 2, 14, 15 and 16) identified generally by numeral 114, comprises a rectangular, vertical container removable from the enclosure of the deposit machine for unloading of accepted deposits. It is disposed underneath the deposit acceptance position, that is, to the rear of document feed rollers 70 and 72 (FIGURE 3) and underneath tray portion 24 when the tray portion is at the deposit acceptance position.

The receptacle includes a housing 130 which is provided with a hinged access door 132. Inside the receptacle, there is disposed a vertically movable shelf 134 which is counterbalanced at either end by a set of springs 136 which encircle a set of vertical guide rods 138 and engage respective blocks 140 attached to the shelf. When a deposit has been accepted by the machine and solenoid 126 is operated to cause removal of the bottom panels from the respective tray section, the stacked items of deposit, the accompanying deposit tag being the lowermost item in the stack, fall under the influence of gravity onto shelf 134 which increasingly moves toward the bottom of the receptacle due to the increasing weight of deposits D, counterbalanced, however, by springs 136. When the receptacle has been emptied, the movable shelf is restored to the top position in order to prevent documents from being required to fall through a great amount of air space which might cause documents to fall out of sequence.

Figure 16:
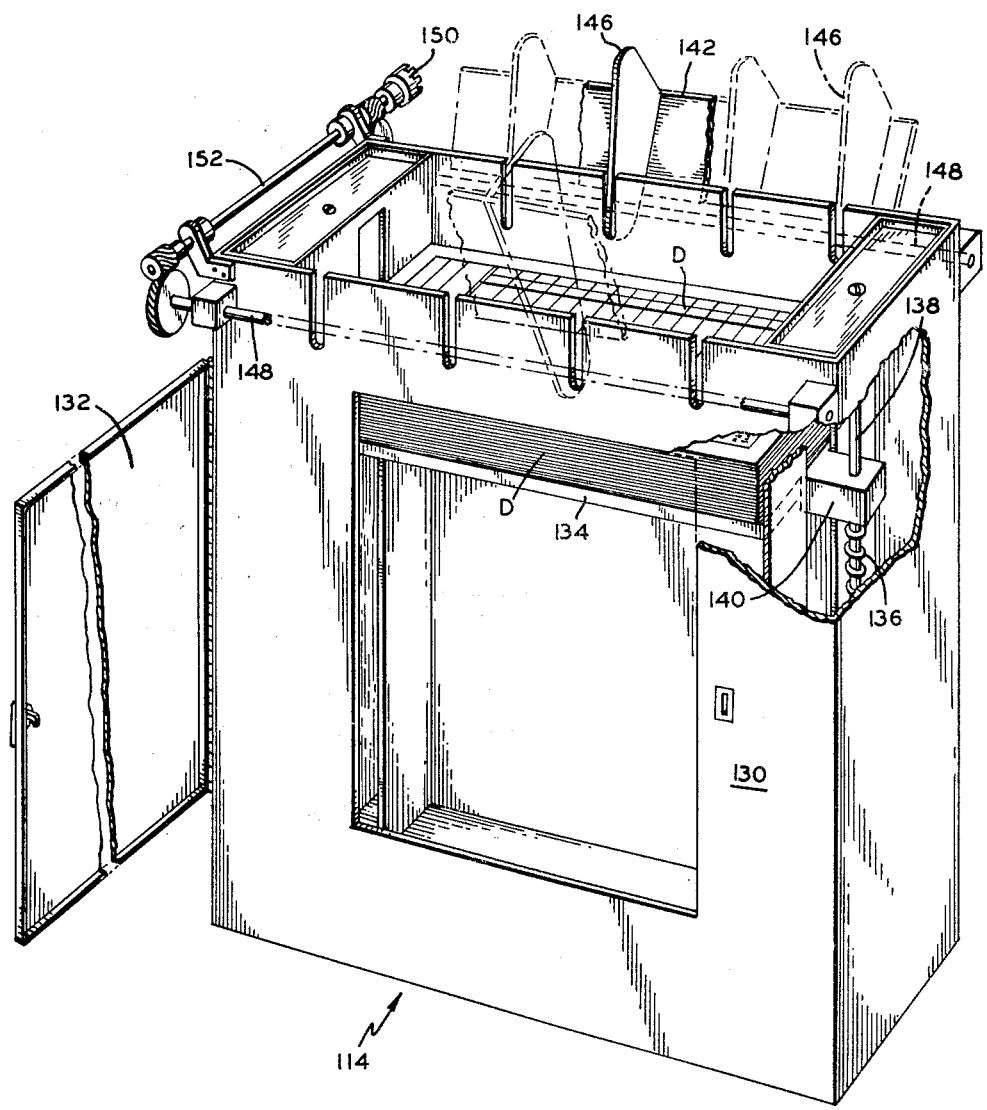
FIGURE 16 is a perspective view of the receptacle which is adapted to receive and store the deposits inside the machine.

The top cover of the receptacle is formed by a pair of flat cover plates 142 and 144 (FIGURES 2, 3 and 14), each plate having attached to its underside a plurality of spacing strips 146. Each plate is hingedly mounted for pivotal motion about a respective longitudinal shaft 148 so that the cover plates can rotate to assume an open or closed position. The cover plates are open as shown in FIGURES 14 and 16 when the machine is ready to accept a deposit from the movable tray. As soon as a deposit has been dropped into the receptacle, a motor 154 (FIGURE 2) coupled to coupling 150 and rotating shaft 152 imparts rotation via suitable left and right handed gearing to the pair of shafts 148 to cause covers 142 and 144 to rotate and assume the closed position. As the cover closes, spaced strips 146 come in contact with the uppermost deposit item and exert pressure upon the deposit to cause downward motion of the shelf 134, moving the shelf by an amount sufficient to provide space for a next succeeding deposit. As can be seen, the respective spacing strips 146 are staggered and move through suitable slots in the receptacle enclosure. The closed position of the receptacle is shown in FIGURES 3 and 15. In this position, the receptacle can be removed from the machine enclosure and transported to a different place for unloading as there is no danger that a deposit will be lost. Coupling 150 is of a quick-disconnect design so that the receptacle can readily be coupled to motor 154 (FIGURE 2) which remains within the depository machine.

Each deposit received within the receptacle is disposed on shelf 134 and, in accordance with the preferred method described heretofore, is separated from a succeeding deposit by a deposit tag which previously rested on tray portion 32. In this way, the beginning of a deposit is clearly discernible as the deposit tag forms the first item of the deposit. It will be apparent that the receptacle is adapted to hold a great number of deposits and can readily be emptied and replaced in the machine enclosure.

Coins deposited through aperture 16, FIGURE 1, reach via chute 162 tray 160 which is also in view of the image recording means. For removal of the coins, the tray is tilted and all coins fall into a separate storage compartment (not shown).

Figure 17:
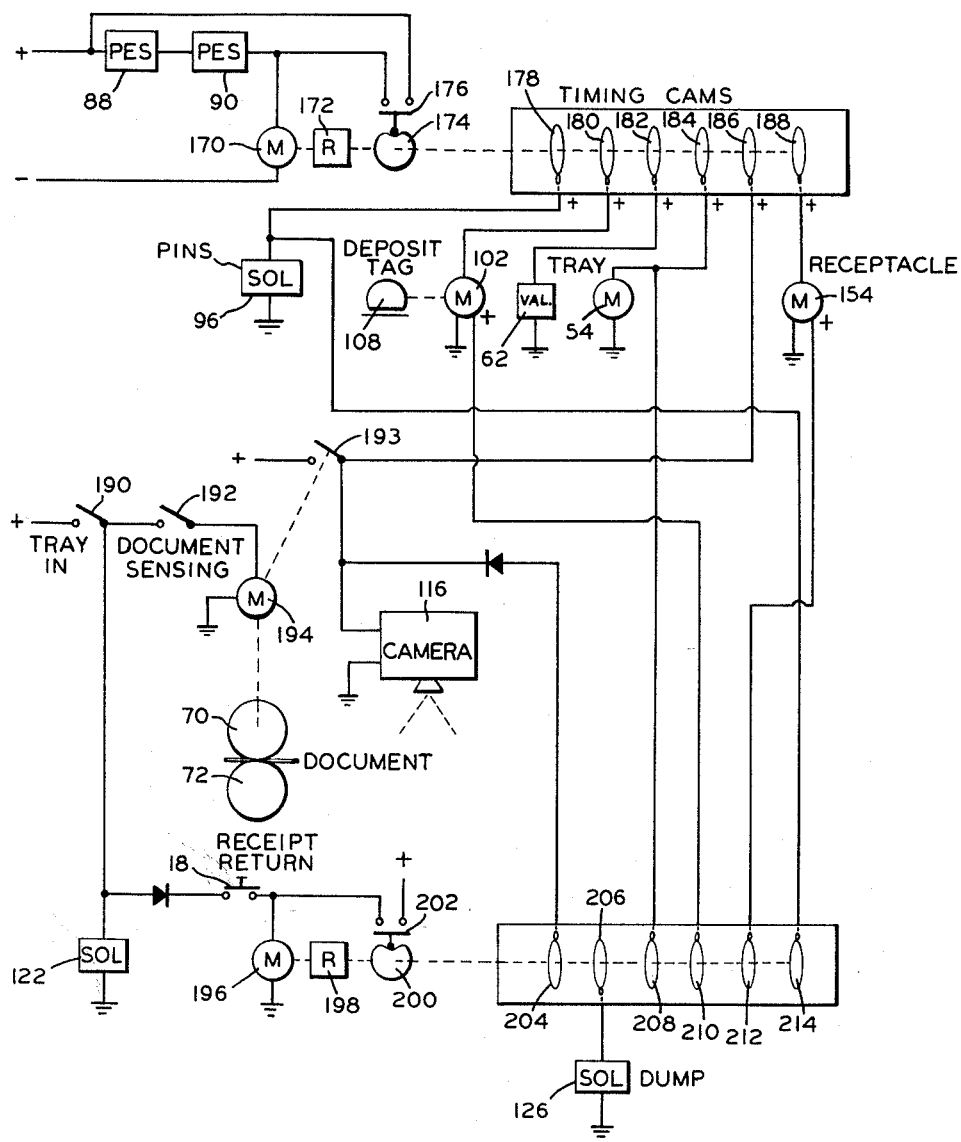
FIGURE 17 is a schematic electrical circuit diagram of the depository machine.

Review of operating cycle and circuit diagram (FIGURE 17)

At the start, movable tray 24 is positioned nearest toward the front panel of the machine where tray portion 26 is in communication with aperture 14b and tray portion 32 is in communication with operture 14a. A depositor desirous of using the machine inserts a respective deposit tag into apertures 14a and 14b, the leading edge of the respective deposit tags being stopped by protruding stop pins 80 and 82 (FIGURE 5). The presence of the deposit tags is sensed by photoelectric sensing means 88 and 90 which establish a circuit to timing motor 170 (FIGURE 17). This motor via gear reduction 172 operates a timing cam 174 which in turn closes contact 176 to cause operation of a timing cam assembly for one complete revolution. Cam 178 (FIGURE 17) upon rotation energizes solenoid 96 to lower stop pins 80 and 82. Cam 180 causes operation of motor 102 to rotate rollers 106 and 108 for one revolution, which action drives the two deposit tags completely onto the tray as shown in FIGURE 5c. Timing cam 182, subsequently energizes validation means 62 for affixing validation indicia to the deposit tag resting on the rear tray portion 26 which is provided with the stationary bottom panel 28.

Next, timing cam 184 operates tray motor 54 to drive the tray toward the rear. As the deposit tag resting on the removable bottom panels passes through the validation means 62, cam 182 re-energizes the validating means to affix validation data to this particular tag. Thus, both tags are validated. Cam 186 operates the image recording means 116 in order to provide a recorded image of the first-validated tag as the latter passes underneath the image recording means. Finally, the tray reaches the end of its rearward travel, and the deposit tag resting on the front tray portion 32 is in view of the camera and is disposed also above the deposit receptacle 114. Motion of the tray has stopped. Cam 188 is timed to operate the receptacle motor 154 to cause receptacle cover plates 142 and 144 to be open as the movable tray reaches the deposit acceptance position.

The presence of the tray at the document acceptance position is sensed by a switch 190 which in turn operates solenoid 122 to raise hinged frame members 36a and 36b (FIGURE 12).

The machine now is ready for accepting items of deposit, particularly checks or currency documents, which are fed through aperture 12. By virtue of switch 190, operation of these feed rollers is blocked until the tray moves into the deposit acceptance position. The insertion of a check or currency document at aperture 12 is sensed by switch 192 which in turn causes operation of motor 194 to drive feed rollers 70 and 72 through one cycle. Operation of motor 194 operates moreover, switch 193 to actuate the image recording means 116 for providing a recorded image of the second deposit tag and subsequently, an image of each check or currency document which is fed between these rollers and comes to rest on top of the previously validated and recorded deposit tag, substantially as shown in FIGURE 7.

When all items have been deposited so that there is a stack of deposited items resting on the tray portion, the deposit tag being lower-most in the stack, the depositor signifies the end of the deposit by operating push button switch 18 which causes operation of timing motor 196. This motor drives via gear reduction 198 a timing cam 200. Operation of this cam closes switch 202 to provide operation of the timing motor for one revolution of an associated cam assembly. Cam 204 causes actuation of image recording means 116 to provide an image of the last item of deposit. Cam 206 operates solenoid 126 to cause the removable bottom panels 34a and 34b to rotate downward, causing the deposit to drop into open receptacle 114. Cam 208 energizes tray motor 54 to effect return motion of the tray. As the tray returns to its original forward position, cam 210 causes reverse motion of motor 102, thus ejecting the returning deposit tag from aperture 14b. This deposit tag, having been validated and recorded, serves as a receipt for the depositor. Cam 212 operates receptacle motor 154 to close the receptacle cover plates, and cam 214 de-energizes solenoid 96 as soon as the receipt type deposit tag has been ejected, permitting the pins to rise so that the machine is ready for acceptance of a new set of deposit tags. As the movable tray left the deposit acceptance position, switch 190 opened the circuit to document feed motor 194 to block feeding of documents through aperture 12 while the tray is remote from the deposit acceptance position. Also, solenoid 122 connected in series with switch 190 is de-energized to release hinged frame members 36a and 36b from their raised position. This completes one cycle of operation.

When the deposit receptacle is filled as may be discerned by the lowered position of the movable shelf, the receptacle is removed from the depository machine and emptied at a convenient location. The removal of the receptacle from the machine enclosure can be made subject to all of the security provisions disclosed in my copending application for U.S. Letters Patent, Serial No. 57,061, now Patent No. 3,110,540, filed: September 9, 1960, entitled: "Security Arrangement for Depository Machine." When the empty receptacle is re-installed, the movable shelf is moved to the top position, which condition is readily ascertainable by means of an electrical interconnect switch.

Modifications

Several modifications will readily be apparent. Although in the preferred embodiment described heretofore two deposit tags are used, the machine may readily be modified to use a single deposit tag which is returned to the depositor. In this event, only aperture 14b is required and by means of suitable reflecting means, a portion of the deposit tag resting on rear tray portion 26 is brought in view of the image recording means. This deposit portion is recorded in association with the checks, currency documents and the like which reach the front tray portion via aperture 12. In this latter case, the beginning and end of a deposit is ascertained by viewing the record made by the image recording means, such as a microfilm strip. The items of deposit again are readily identifiable by virtue of their association with the deposit tag provided by the depositor. Also the first item of deposit seen on the film is the deposit tag. By changing the timing cam so that the deposit tag is recorded during the return motion of the tray, the image of the deposit tag can be shifted to be the last item of deposit or alternatively, the deposit tag may be recorded twice, that is at the beginning and at the end of the deposit action.

Moreover, by means of an additional mirror or suitable tilting of image reflecting means 120 it is readily possible to record an image of a portion of both deposit tags, that is, the tag on the front and rear tray portions respectively. Quite similarly, the tray can be arranged to be in complete alignment with the document feed rollers so that deposit tag 66 (FIGURE 7) is obscured, in which case an image from the tag disposed on the rear tray portion is used for identifying purposes.

Provisions may be made to detect that an image of the documents reaches the image recording means. These provisions comprise an inclined transparent reflecting means placed directly in front of the recording means and associated light sensing means which, inter-connected in the control circuit, ascertain the presence of an image at said inclined means when the recording means are actuated. In the absence of an image, acceptance of deposits is stopped.

While there has been described and illustrated a preferred embodiment of the present invention and certain modifications thereof, it will be apparent to those skilled in the art that various further changes and modifications may be made therein without deviating from the principle and intent of the invention which shall be limited only by the scope of the appended claims.

What is claimed is:
1. A depository machine comprising:
an enclosure;
aperture means in said enclosure for passing a document into said enclosure;
image recording means having a view within said enclosure;
first conveying means within said enclosure for receiving a document from said aperture means and for disposing this document in said view of said image recording means; and
second conveying means for conveying a document from said aperture means to said first conveying means, and from said first conveying means to said aperture means.

2. A depository machine comprising:
an enclosure;
aperture means in said enclosure for passing a document into said enclosure;
image recording means having a view within said enclosure;
first conveying means within said enclosure for receiving a document from said aperture means and for disposing this document in said view of said image recording means;
said first conveying means including a pair of pivotally mounted panels normally disposed in a given plane with respect to said first conveying means for supporting this document and pivotable out of said given plane for releasing this document from said first conveying means between said panels; and
second conveying means for conveying a document from said aperture means to said pair of panels.

3. A depository machine comprising:
an enclosure;
aperture means in said enclosure for passing a document into said enclosure;
receptacle means in said enclosure for receiving a document;
said receptacle means including
a subenclosure having an aperture at one end thereof,
means for supporting a document disposed within said subenclosure, normally at a given position adjacent said aperture and movable from said given position to a position further within said enclosure, and
means for normally closing said aperture and for moving said document supporting means away from said given position by a distance equal to the thickness of the documents supported by said document supporting means; and
means for conveying a document from said enclosure aperture means to said subenclosure aperture.

4. A depository machine according to claim 3 wherein said means for normally closing said aperture is disposable in a first position whereat said aperture is closed, and is disposable in a second position whereat said aperture is open; and further including
control means, coupled to said means for closing, for disposing said means for closing from and to said first and second positions.

5. In a depository machine which includes image recording means the combination of:
an enclosure;
a first and a second aperture on said enclosure;
said first aperture adapted to receive singly and in sequence documents such as checks, currency, and the like;
the second aperture adpated to receive a deposit tag;
a movable tray cooperating with the second aperture so that a deposit tag inserted through the second aperture is received on the tray whereby said tag is temporarily rendered inaccessible;
validating means disposed for validating a deposit tag received on the tray;

control means causing operation of said validating means when the tag is disposed on the tray;

means moving said tray from the position at which the deposit tag is received and validated to a deposit acceptance position;

means for feeding serially documents through said first aperture and such documents coming to rest and stacked on a portion of the tray;

image recording means disposed to view documents fed through said first aperture and coming to rest on the respective tray portion;

control means actuating said image recording means in response to the feeding of documents into the enclosure whereby to provide in sequence a recorded image of each document disposed on the tray;

said tray portion having a removable bottom panel which is normally disposed in a given area in a given plane with respect to said tray portion for supporting the stacked documents in said view of said image recording means, and which is removable out of said given area in said given plane for releasing the stacked documents from said tray portion;

a receptacle disposed underneath said removable panel;

control means operable for causing the removal of the bottom panel from the tray whereby the stacked documents fed through the first aperture means and resting on the respective tray portion are caused to drop into the receptacle, and means causing said validated and recorded tag to be moved from the tray and rendered accessible from the exterior of the enclosure to serve as a receipt.

6. A depository machine including:

an enclosure;

a first and a second aperture on said enclosure;

said first aperture adapted to receive singly and in sequence documents such as checks, currency, and the like;

said second aperture adapted to receive a deposit tag;

a movable tray adapted to cooperate with said second aperture so that a deposit tag inserted through the second aperture is received on said tray, whereby the tag is temporarily rendered inaccessible;

validating means disposed for validating a deposit tag received on said tray;

control means coupled to said validating means for causing operation of said validating means when the tag is disposed on said tray;

means for moving said tray from the position at which the deposit tag is received and is validated to a deposit acceptance position;

means for feeding serially documents through said first aperture, such documents coming to rest stacked on a portion of said tray;

image recording means disposed to view documents fed through said first aperture and coming to rest on said tray portion;

control means coupled to said image recording means for actuating said image recording means for providing in sequence a recorded image of each document disposed on said tray;

said tray portion having a removable bottom panel;

a receptacle disposed underneath said removable bottom panel;

control means operable for causing the removal of said bottom panel from said tray whereby the stacked documents fed through said first aperture and resting on said tray portion are caused to drop into said receptacle; and means for causing the validated and recorded tag to be moved from said tray and rendered accessible from the exterior of said enclosure to serve as a receipt, including power operated drive means for feeding the tag on the tray and causing partial removal of the validated tag from the tray.

7. In a depository machine which includes image recording means the combination of:

an enclosure;

a first and a second aperture means on said enclosure;

said first aperture means adapted to receive singly and in sequence documents such as checks, currency, and the like;

the second aperture means adapted to receive a pair of deposit tags;

a movable tray cooperating with the second aperture means so that the deposit tags inserted through the second aperture means are received on the tray;

validating means disposed for validating the deposit tags received on the tray;

control means causing operation of said validating means when the tags are disposed on the tray;

means moving said tray from the position at which the deposit tags are received to a deposit acceptance position;

means for feeding serially documents through said first aperture means and such documents coming to rest and stacked on one of said tags and on a portion of the tray;

image recording means disposed to view documents fed through said first aperture means and coming to rest on the respective tray portion;

contol means actuating said image recording means in response to the feeding of documents into the enclosure whereby to provide in sequence a recorded image of each document disposed on the tray and a portion of one of said tags;

said tray portion having a removable bottom panel which is normally disposed in a given area in a given plane with respect to said tray portion for supporting the stacked documents in said view of said image recording means, and which is removable out of said given area in said given plane for releasing the stacked documents from said tray portion;

a receptacle disposed underneath said removable panel;

control means operable for causing the removal of the the bottom panel from the tray whereby the stacked documents and one deposit tag are caused to drop into the receptacle, and means subsequently causing return motion of the tray to the position at which the deposit tags were accepted and removal of the other validated deposit tag to a position where this tag, serving as a receipt, is accessible from the exterior of the enclosure.

8. In a depository machine which includes image recording means the combination of:

an enclosure;

a first and a second aperture means on said enclosure;

said first aperture means cooperating with a set of parallel rollers for receiving singly and in sequence documents such as checks, currency documents and the like and said rollers being aligned substantially in a vertical plane;

said second aperture means being disposed in front of said plane and a depository receptacle being disposed behind said plane;

a tray movable in a substantially horizontal plane disposed to reciprocate through the plane of said rollers;

said tray when disposed in front of the respective roller plane being adapted for communication with the second aperture means for receiving thereon a pair of deposit tags which are supplied through said second aperture means;

validating means disposed in front of said roller plane for engaging the first deposit tag when the latter is received on the tray;

means causing actuation of said validating means whereby to cause the first tag to be provided with validation indicia;

means for moving said tray from the position in front of said roller plane to a position behind the plane and above said deposit receptacle whereby during the travel of the tray, said second deposit tag is momentarily engaged by said validating means and validated;

said tray when disposed above said receptacle being located so that documents fed through the rollers at said first aperture means come to rest on the second tag on a portion of the tray;

image recording means disposed to provide a correlated image of each document and a portion of one of said tags when such documents are disposed on the tray;

control means actuating said recording means in response to the feeding of documents through said first aperture means;

means causing said second tag and the deposit received from said first aperture means and disposed on the receptacle portion to be transferred to the receptacle disposed underneath;

means returning the tray to its starting position where the tray is in communication with the second aperture means;

means for engaging said first deposit tag and ejecting it from the enclosure via said second aperture means, and control means for disabling said rollers when said tray is in front of said roller plane.

9. In a depository machine which includes image recording means the combination of:
an enclosure;
a first and a second aperture means on said enclosure;
said first aperture means cooperating with a set of parallel rollers for receiving singly and in sequence documents such as checks, currency documents and the like and said rollers being aligned substantially in a vertical plane;
said second aperture means being disposed in front of said plane and a depository receptacle being disposed behind said plane;
a tray movable in a substantially horizontal plane disposed to reciprocate through the plane of said rollers;
said tray being divided to have a first portion which has a stationary bottom panel and a second portion which has a movable bottom panel adapted to provide an opening;
said tray when disposed in front of the respective roller plane being adapted for communication with the second aperture means for receiving on each portion a respective deposit tag which tags are supplied through said second aperture means;
validating means disposed in front of said roller plane for engaging one of the deposit tags when the latter is received on the tray;
means causing actuation of said validating means whereby to cause the tag to be provided with validation indicia;
means for moving said tray from the position in front of said roller plane to a position behind the plane where said second tray portion is disposed above said deposit receptacle;
control means actuating said validating means during the travel of the tray to the position behind said plane whereby to cause validation of the other deposit tag when the latter is in position for validation by said validating means;
said tray when disposed above said receptacle being located so that documents fed through said first aperture means come to rest partially on the tag and on the second tray portion;
image recording means disposed to provide a correlated image of each document and a portion of one of said tags when such documents are disposed on the tray;
control means actuating said recording means in response to the feeding of documents through said first aperture means;
means subsequently causing motion of the bottom panel to provide an opening to the receptacle disposed underneath whereby to cause the tag and deposit received on the second tray portion to be transferred to the receptacle;
means returning the tray to its starting position where the tray is in communication with the second aperture means,
and further means for engaging the deposit tag still remaining on the first tray portion and ejecting the tag from the enclosure via said second aperture means.

10. In a depository machine which includes image recording means the combination of:
an enclosure;
an image recording means and a depository receptacle disposed in said enclosure;
a tray adapted to be placed in view of the image recording means and above the receptacle;
aperture means on the enclosure for feeding deposit tags, documents and the like onto said tray;
control means for actuating the image recording means in response to the feeding operation to record an image of each document disposed on said tray;
means coacting with said tray for transferring said documents from the tray to the receptacle after an image of said documents has been recorded;
said receptacle having a movable shelf to support the documents and a cover adapted to selectively expose and conceal the receptacle area above said shelf;
and control means for causing the cover to expose said area when the documents are transferred from the tray to the receptacle and to conceal the area when the transfer of documents has been accomplished.

11. In a depository machine which includes image recording means the combination of:
an enclosure;
an image recording means and a depository receptacle disposed in said enclosure;
a horizontally movable tray normally maintained remote from said receptacle adapted to be placed in view of the image recording means and above the receptacle;
aperture means on the enclosure for feeding deposit tags, documents and the like onto said tray whereby such documents are disposed above said receptacle when said tray is in view of the image recording means;
control means for actuating the image recording means in response to the feeding of documents to record an image of each document disposed on said tray;
said tray having a movable bottom panel;
means operated after an image of said documents has been recorded for moving said bottom panel whereby to transfer the documents from the tray to the receptacle disposed underneath;
said receptacle having a vertically movable shelf to support the documents transferred to the receptacle and a movable cover adapted to selectively expose and conceal the receptacle area above said shelf,
and control means for causing the cover to move whereby to expose said area when transferring documents from the tray to the receptacle and to conceal the area when the transfer of documents has been accomplished.

12. In a depository machine as set forth in claim 11 wherein said movable cover is provided with means which upon concealing the area above the shelf depress the movable shelf in a downward direction to provide a predetermined space for the next succeeding documents.

13. In a depository machine which includes image recording means the combination of:
an enclosure;
an image recording means, a depository receptacle, and a tray reciprocating in a horizontal plane disposed in said enclosure;

said tray having a first portion which is equipped with a stationary bottom panel and a second portion which is provided with a set of hinged bottom panels;

said panels when disposed substantially along a horizontal plane providing a flat surface for supporting documents and when rotated to a vertical position providing an opening through which such documents are transferred to said receptacle;

means for causing said tray to move along said plane for occupying selectively a position at which the second tray portion is remote from said receptacle or the alternative position where the second portion is in view of the image recording means and above said receptacle;

aperture means on the enclosure for feeding deposit tags onto each of the respective tray portions when said second tray portion is remote from the receptacle;

validating means disposed in said enclosure and adapted to engage said deposit tags received on said tray;

control means for actuating said validating means in response to the receipt of the tags on said tray whereby to validate each tag;

means for moving said tray from the position at which the tags are fed onto the tray to the alternative position;

further aperture means on said enclosure for feeding documents onto said tray whereby such documents are received on the second tray portion while the hinged bottom panels are disposed substantially along a horizontal plane;

control means for actuating the image recording means in response to the feeding of documents through said further aperture means to record an image of each document disposed on said respective tray portion;

means for rotating said bottom panels after an image of said documents has been recorded to produce said opening and transfer the documents and tag from the respective tray portion to the receptacle disposed underneath;

said receptacle having a vertically movable shelf to support the documents transferred thereto and a movable cover for selectively exposing and concealing the receptacle area above said shelf;

control means for causing the cover to move whereby to expose said area when transferring documents from the tray to the receptacle and to conceal the area when the transfer of documents has been accomplished;

means subsequently restoring the hinged panels to their substantially horizontal plane and returning the movable tray to its position where the second tray portion is remote from said receptacle, and means for partially removing the validated deposit tag from the first tray portion to render this tag available as a receipt for the deposit of documents stored in the receptacle.

14. A depository machine comprising:

an enclosure;

a first aperture in said enclosure for receiving a deposit tag;

first conveying means in said enclosure cooperating with said first aperture for receiving a deposit tag therefrom and supporting and conveying the tag within said enclosure from a first position to a second position;

validating means in said enclosure for validating a tag at said first position;

image recording means having a view of said second position;

second aperture and conveying means in said enclosure for receiving documents such as checks, currency and the like, and conveying them sequentially to said second position;

receptacle means having an entrance disposed below and adjacent said second position;

control means for sensing the presence of a tag in said first position and thereupon sequentially: actuating said validating means to validate the tag; actuating said first conveying means to move the tag to said second position; actuating said recording means to record an image of the tag; actuating said second aperture and conveying means to singly and sequentially move the documents to said second position, to dispose the documents on the tag into a stack, and actuating said recording means to record an image of each document on the stack; and actuating said first conveying means to release the stack into said receptacle means.

15. A depository machine comprising:

an enclosure;

a first aperture in said enclosure for receiving a deposit tag;

first conveying means in said enclosure including removable support means for receiving thereon the deposit tag from said first aperture and conveying the tag from a first position to a second position;

validating means in said enclosure for validating a tag at said first position;

image recording means having a view of said second position;

second aperture and conveying means in said enclosure for receiving documents such as checks, currency and the like, and conveying them sequentially to said second position;

receptacle means having a movable support means disposed below and adjacent said second position;

control means for sensing the receipt of a tag through said first aperture means and thereupon sequentially: conveying the tag onto said support means; actuating said validating means to validate the tag; actuating said first conveying means to move the tag to said second position; actuating said recording means to record an image of the tag; actuating said second aperture and conveying means to singly and sequentially move the documents to said second position, to dispose the documents on the tag into a stack, and actuating said recording means to record an image of each document on the stack; and removing said conveyor support means from the stack to release the stack onto said receptacle support means.

16. A depository machine according to claim 15 wherein said receptacle means includes means to move said receptacle support means an additional distance below said second position equal to the height of the stack released to said support means;

said control means actuating said receptacle support moving means after the stack has been released to said receptacle support means.

17. A depository machine according to claim 15 wherein said control means includes intermediate conveying means for conveying the deposit tag from said first aperture to said first conveying means.

18. A depository machine comprising:

an enclosure;

a first and a second aperture for receiving respectively a first and a second deposit tag;

conveying means in said enclosure sequentially operable from a normal first, to a second, to a third position and including first and removable second support means for receiving respectively thereon the first and the second deposit tags from said first and said second apertures when in said first position;

validating means in said enclosure for validating a tag on said first support means when said conveying means is in said first position and for validating a tag on said second support means when said conveying means is in said second position;

image recording means having a view of said first support means when said conveying means is in said second position and having a view of said second support means when said conveying means is in said third position;

third aperture and conveying means in said enclosure for receiving documents such as checks, currency and the like, and conveying them to said second support means when said conveying means is in said third position;

receptacle means having an entrance disposed below and adjacent said second support means when said conveying means is in said third position;

control means for sensing the receipt of a tag by said first and second apertures respectively and thereupon sequentially: conveying the tags to said first and second support means respectively; actuating said validating means to validate the tag on said first support means; moving said conveying means to said second position; actuating said validating means and said recording means to respectively validate the tag on said second support means and record the image of the tag on said first support means; moving said conveying means to said third position; actuating said third aperture and conveying means and said image recording means to respectively singly and sequentially convey documents to said second support means, dispose the documents on the tag an said second support means into a stack and record images of the tag and the documents forming the stack; removing said second support means from the stack to release the stack to said receptacle means entrance; returning said conveying means to said first position; and returning the tag from said first support to said first aperture.

19. A depository machine according to claim 18 wherein said receptacle means includes a movable support means in said entrance to receive the stack when it is released from said conveyor second support means, and means to move said receptacle support means after the stack has been released a distance below said conveyor second support means equal to the height of the stack.

References Cited in the file of this patent

UNITED STATES PATENTS

| | | |
|---|---|---|
| 3,021,050 | Roger | Feb. 13, 1962 |
| 3,092,433 | Simjian | June 4, 1963 |

FOREIGN PATENTS

| | | |
|---|---|---|
| 605,678 | Germany | Feb. 4, 1933 |